(12) United States Patent
Nozaki

(10) Patent No.: US 11,059,471 B2
(45) Date of Patent: Jul. 13, 2021

(54) POWER TRANSMISSION DEVICE AND METHOD FOR CONTROLLING SAME

(71) Applicant: AISIN AW CO., LTD., Anjo (JP)

(72) Inventor: Masahiro Nozaki, Nishio (JP)

(73) Assignee: AISIN AW CO., LTD., Anjo (JP)

(*) Notice: Subject to any disclaimer, the term of this patent is extended or adjusted under 35 U.S.C. 154(b) by 7 days.

(21) Appl. No.: 16/605,967

(22) PCT Filed: May 21, 2018

(86) PCT No.: PCT/JP2018/019466
§ 371 (c)(1),
(2) Date: Oct. 17, 2019

(87) PCT Pub. No.: WO2018/216649
PCT Pub. Date: Nov. 29, 2018

(65) Prior Publication Data
US 2020/0079345 A1    Mar. 12, 2020

(30) Foreign Application Priority Data
May 22, 2017 (JP) .............................. JP2017-100634

(51) Int. Cl.
*B60W 10/02* (2006.01)
*B60W 10/06* (2006.01)
(Continued)

(52) U.S. Cl.
CPC ............ *B60W 10/06* (2013.01); *B60W 10/02* (2013.01); *F02D 29/02* (2013.01); *F16H 59/54* (2013.01);
(Continued)

(58) Field of Classification Search
CPC .... B60W 10/02; B60W 10/06; B60W 10/107; B60W 30/18109; B60W 30/20;
(Continued)

(56) References Cited

U.S. PATENT DOCUMENTS

2009/0209382 A1* 8/2009 Tabata ................. B60W 10/08
475/5
2012/0053012 A1 3/2012 Yamada et al.
(Continued)

FOREIGN PATENT DOCUMENTS

CN 102381306 A 3/2012
CN 102734454 A 10/2012
(Continued)

OTHER PUBLICATIONS

International Search Report for PCT/JP2018/019466 dated Aug. 21, 2018 [PCT/ISA/210].

*Primary Examiner* — Edwin A Young
(74) *Attorney, Agent, or Firm* — Sughrue Mion, PLLC

(57) ABSTRACT

A power transmission device mounted on a vehicle in which operation of an engine is stopped when vehicle speed has been reduced to a predetermined vehicle speed. The device includes an oil pump driven by the engine; a hydraulic control device regulating pressure from the oil pump; a continuously variable transmission mechanism in which groove widths of a primary pulley and a secondary pulley are set by hydraulic pressure from the hydraulic control device; a hydraulic engagement element engaged by hydraulic pressure from the hydraulic control device to couple the continuously variable transmission mechanism to the engine; a clamping pressure sensor that detects clamping pressure of a belt of the continuously variable transmission mechanism; and a control device disengaging the hydraulic engagement element when the detected clamping pressure of the belt reaches less than or equal to a threshold value after operation of the engine is stopped.

7 Claims, 5 Drawing Sheets

(51) Int. Cl.
  *F02D 29/02* (2006.01)
  *F16H 59/54* (2006.01)
  *F16H 61/00* (2006.01)
  *F16H 63/50* (2006.01)

(52) U.S. Cl.
  CPC ......... *F16H 61/0031* (2013.01); *F16H 63/50* (2013.01)

(58) Field of Classification Search
  CPC ..... B60W 2030/203; B60W 2030/206; B60W 2510/1075; B60W 2510/108; B60W 2510/1085; B60W 2510/18; B60W 2520/10; B60W 2520/105; B60W 2540/12; B60W 2710/021; B60W 2710/06; F02D 29/02; F16H 59/54; F16H 61/0031; F16H 63/50
  See application file for complete search history.

(56) References Cited

U.S. PATENT DOCUMENTS

| | | | |
|---|---|---|---|
| 2012/0259521 | A1 | 10/2012 | Totsuka et al. |
| 2013/0260960 | A1* | 10/2013 | Aoyama ........... F16H 61/66272 477/45 |
| 2014/0371012 | A1 | 12/2014 | Moriyama et al. |
| 2017/0217438 | A1* | 8/2017 | Iwamoto ............... B60W 10/06 |

FOREIGN PATENT DOCUMENTS

| | | | |
|---|---|---|---|
| CN | 103998827 | A | 8/2014 |
| JP | 6-109121 | A | 4/1994 |
| JP | 2001-263473 | A | 9/2001 |
| JP | 2006-46525 | A | 2/2006 |
| JP | 2012-51468 | A | 3/2012 |
| JP | 2012-117604 | A | 6/2012 |
| JP | 2015-113912 | A | 6/2015 |

* cited by examiner

POWER TRANSMISSION DEVICE AND METHOD FOR CONTROLLING SAME

CROSS REFERENCE TO RELATED APPLICATIONS

This application is a National Stage of International Application No. PCT/JP2018/019466, filed on May 21, 2018, which claims priority from Japanese Patent Application No. 2017-100634, filed on May 22, 2017.

TECHNICAL FIELD

The present disclosure relates to a power transmission device including an oil pump and a belt type continuously variable transmission mechanism which are driven by an engine mounted on a vehicle, and a method for controlling the power transmission device.

BACKGROUND ART

Conventionally, there is known a power transmission device including a belt type continuously variable transmission mechanism interposed between an engine and drive wheels; a clutch provided in a powertrain having the continuously variable transmission mechanism placed therein; a mechanical oil pump driven by the engine to supply hydraulic pressure to the clutch; and coast stop control means for stopping the engine when a predetermined start condition holds true during vehicle's coast traveling, and restarting the engine when a predetermined end condition holds true (see, for example, Patent Literature 1). In the power transmission device, a reduction in the number of revolutions of the engine is monitored from the start of coast stop control, and when the number of revolutions of the engine has reached a predetermined number of revolutions, the above-described clutch is disengaged. The predetermined number of revolutions is determined so as to suppress the occurrence of shock caused by unintended disengagement of the clutch which results from a reduction in hydraulic pressure from the mechanical oil pump associated with a reduction in the number of revolutions of the engine, and so as to be able to handle an engine restart request (acceleration request) made based on an accelerator stepping operation performed after the start of coast stop control.

CITATIONS LIST

Patent Literature

Patent Literature 1: JP 2015-113912 A

SUMMARY OF DISCLOSURE

In the above-described conventional power transmission device, when the engine is stopped during coast traveling, hydraulic pressure supplied to the clutch decreases with a reduction in the number of revolutions of the engine, i.e., the oil pump. Therefore, in order to keep a belt of the continuously variable transmission mechanism from slipping before the clutch is disengaged, there is a need to disengage the clutch before the number of revolutions of the engine reaches a number of revolutions at which sufficient clamping pressure of the belt cannot be secured by oil discharged from the oil pump. However, the flow rate balance of a hydraulic system connected to the oil pump is likely to be influenced by variations in hardware, and the calculation accuracy of the number of revolutions of the engine deteriorates as the number of revolutions of the engine decreases. Therefore, in the above-described conventional power transmission device, the belt of the continuously variable transmission mechanism may slip after the engine is stopped during coast traveling, which may reduce the durability of the belt. In addition, if, in order to suppress a slip of the belt of the continuously variable transmission mechanism, the above-described predetermined number of revolutions serving as a threshold value is set to a high value, taking into account the flow rate balance of the hydraulic system and variations in the calculation accuracy of the number of revolutions of the engine, then the clutch needs to be engaged based on an accelerator stepping operation performed after start of coast stop control, reducing responsiveness to an acceleration request by a driver. Such a problem can likewise also occur in a case in which the operation of the engine is stopped when the vehicle speed of a vehicle having a belt type continuously variable transmission mechanism mounted thereon has been reduced to a predetermined vehicle speed.

An aspect of the present disclosure therefore excellently suppresses a slip of a belt of a continuously variable transmission mechanism occurring after the operation of an engine is stopped in response to deceleration of a vehicle.

A control device for a power transmission device of the present disclosure is a power transmission device mounted on a vehicle in which operation of an engine is stopped when vehicle speed has been reduced to a predetermined vehicle speed, the power transmission device including an oil pump driven by the engine to discharge oil; a hydraulic control device that regulates pressure of oil from the oil pump; a continuously variable transmission mechanism including a primary pulley, a secondary pulley, a belt wound around the primary pulley and the secondary pulley, a first hydraulic cylinder that sets a groove width of the primary pulley by hydraulic pressure from the hydraulic control device, and a second hydraulic cylinder that sets a groove width of the secondary pulley by hydraulic pressure from the hydraulic control device; a hydraulic engagement element that is engaged by hydraulic pressure from the hydraulic control device to couple the continuously variable transmission mechanism to the engine or drive wheels of the vehicle; and a clamping pressure sensor that detects clamping pressure of the belt applied by the first or second hydraulic cylinder, and the power transmission device including: an engagement element control part that controls the hydraulic control device to disengage the hydraulic engagement element when clamping pressure of the belt detected by the clamping pressure sensor has reached less than or equal to a threshold value after operation of the engine is stopped in response to deceleration of the vehicle.

The engagement element control part of the power transmission device controls the hydraulic control device to disengage the hydraulic engagement element when clamping pressure of the belt detected by the clamping pressure sensor has reached less than or equal to the threshold value after the operation of the engine is stopped in response to deceleration of the vehicle. As such, by detecting clamping pressure of the belt by the clamping pressure sensor and comparing the detection value of the clamping pressure sensor with the threshold value, it becomes possible to accurately determine whether sufficient clamping pressure of the belt can be secured by oil discharged from the oil pump. Furthermore, upon making a disengagement determination of the hydraulic engagement element, there is no need to use the number of revolutions of the engine whose accuracy deteriorates in a low revolution range, and the influence of variations in hardware in the hydraulic control device can be substantially eliminated. By this, the hydraulic engagement element is disengaged at appropriate timing after the operation of the engine is stopped in response to deceleration of the vehicle, to disconnect the continuously variable transmission mechanism from the engine or the drive wheels, enabling to excellently suppress a slip of the belt of the continuously variable transmission mechanism. Furthermore, responsiveness to acceleration when a restart of the engine is requested after the operation of the engine is stopped in response to deceleration of the vehicle can be excellently secured.

DESCRIPTION OF EMBODIMENTS

Next, a mode for carrying out various aspects of the present disclosure will be described with reference to the drawings.

Figure 1:
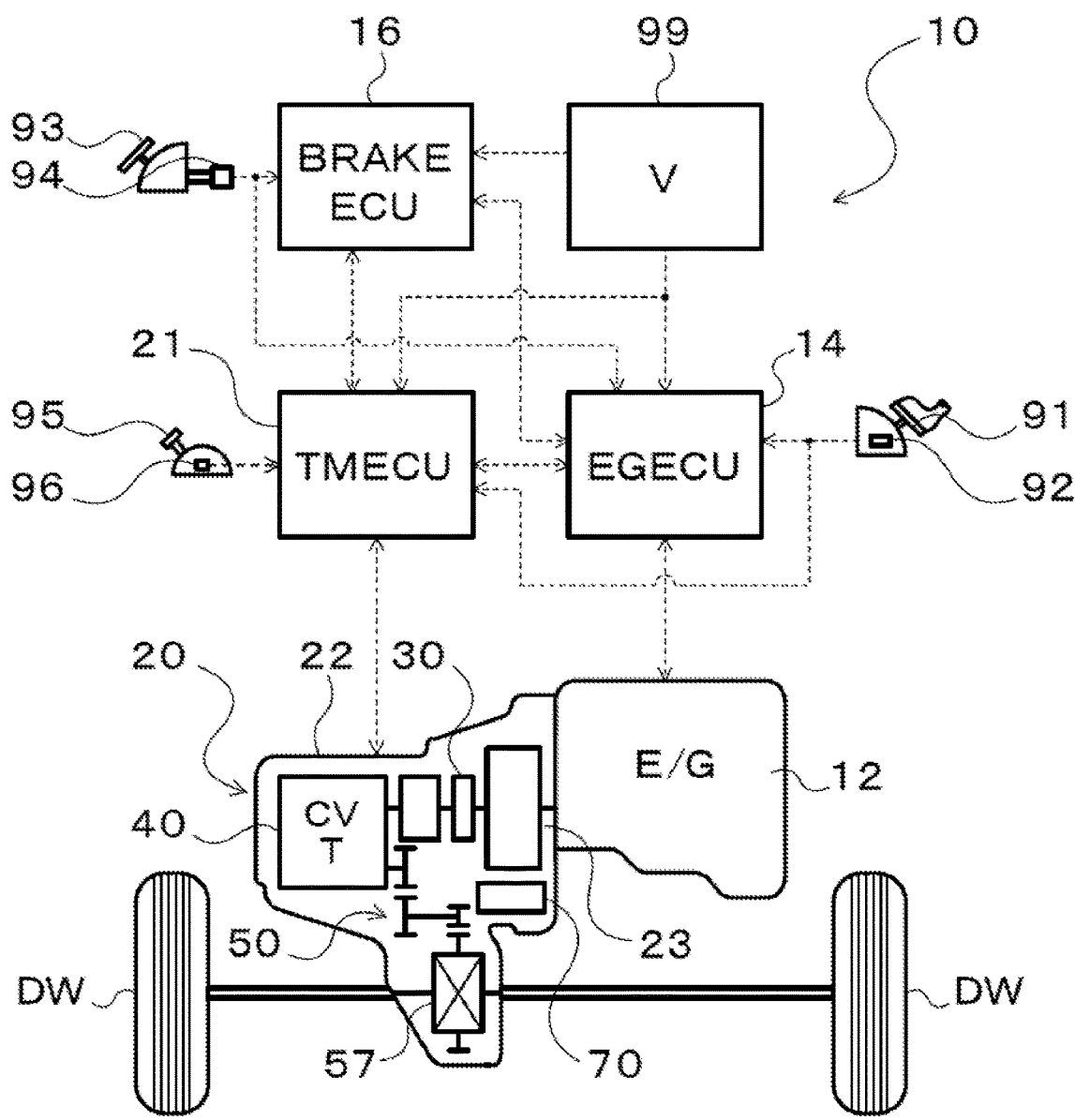
FIG. 1 is a schematic configuration diagram of a vehicle having a power transmission device of the present disclosure mounted thereon.

FIG. 1 is a schematic configuration diagram of a vehicle 10 having a power transmission device 20 of the present disclosure mounted thereon. The vehicle 10 shown in the drawing is a front-wheel-drive vehicle including an engine (internal combustion engine) 12 mounted on a vehicle's front portion, and includes an engine electronic control unit (hereinafter, referred to as "EGECU") 14 that controls the engine 12, a brake electronic control unit (hereinafter, referred to as "brake ECU") 16 that controls an electronically controlled hydraulic brake unit which is not shown, and a transmission electronic control unit (hereinafter, referred to as "TMECU") 21 that controls the power transmission device 20, in addition to the power transmission device 20 that transmits power from the engine 12 to left and right drive wheels (front wheels) DW.

The EGECU 14 includes a microcomputer including a CPU, a RAM, a ROM, etc., various types of drive circuits, etc., which are not shown, and accepts, as input, for example, signals from various types of sensors such as a crankshaft position sensor (not shown) that detects a rotational position of a crankshaft of the engine 12, an accelerator pedal position sensor 92 that detects the amount of stepping on an accelerator pedal 91 (accelerator pedal position Acc), a master cylinder pressure sensor 94 that detects master cylinder pressure applied based on the amount of stepping on a brake pedal 93, and a vehicle speed sensor 99, etc., and signals from the brake ECU 16 and the TMECU 21. The EGECU 14 controls, based on the signals, a throttle valve, a fuel injection valve, and an ignition plug which are of an electronically controlled type (not shown), etc. In addition, the EGECU 14 calculates the number of revolutions Ne of the engine 12, based on a detection value of the crankshaft position sensor.

Furthermore, the EGECU 14 performs deceleration idle reduction control that stops the operation of the engine 12 when the vehicle speed V of the vehicle 10 has been reduced to a predetermined engine stop vehicle speed Vref higher than zero (predetermined vehicle speed: for example, about 10 to 15 km/h) in response to a driver stepping on the brake pedal 93, and restarts the engine 12 in response to the driver stepping on the accelerator pedal 91 (start request). By this, it becomes possible to further improve the fuel efficiency of the engine 12.

The brake ECU 16 also includes a microcomputer including a CPU, a RAM, a ROM, etc., various types of drive circuits, etc., which are not shown, and accepts, as input, for example, signals from various types of sensors such as the master cylinder pressure sensor 94 and the vehicle speed sensor 99, etc., and signals from the EGECU 14, etc. The brake ECU 16 controls a brake actuator (hydraulic actuator), etc., which are not shown, based on the signals.

The TMECU 21 also includes a microcomputer including a CPU, a RAM, a ROM, etc., various types of drive circuits, etc., which are not shown, and accepts, as input, for example, signals from various types of sensors such as a shift position sensor 96 that detects an operation position of a shift lever 95 for selecting a desired shift position among a plurality of shift positions, the accelerator pedal position sensor 92, and the vehicle speed sensor 99, etc., and signals from the EGECU 14 and the brake ECU 16. The TMECU 21 controls the power transmission device 20, based on the signals.

Figure 2:
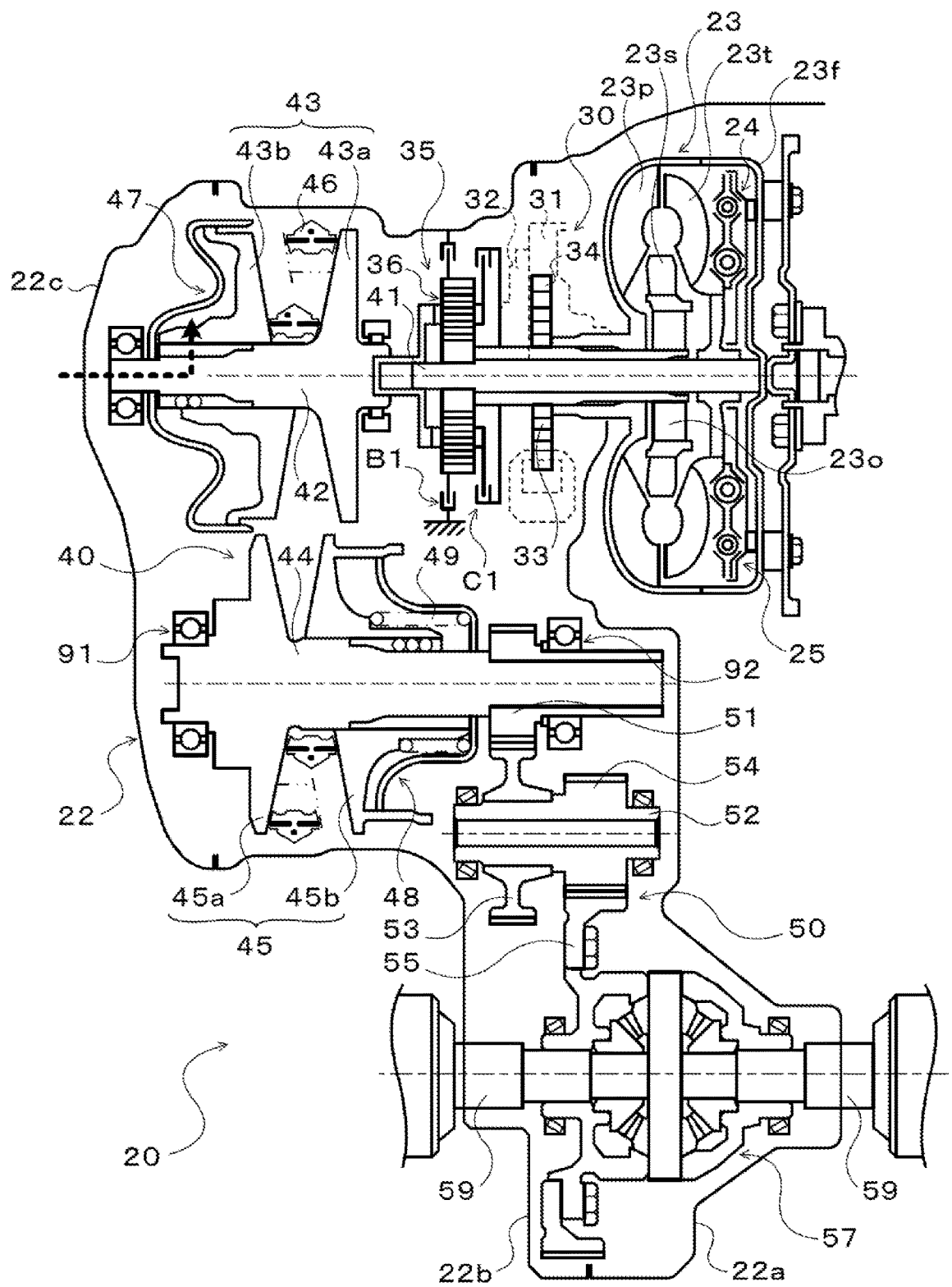
FIG. 2 is a schematic configuration diagram showing the power transmission device of the present disclosure.

As shown in FIG. 2, the power transmission device 20 is formed as a transaxle coupled to the engine 12 which is horizontally disposed such that the crankshaft of the engine 12 is substantially parallel to left and right drive shafts 59 connected to drive wheels which are not shown. As shown in FIGS. 1 and 2, the power transmission device 20 includes a transmission case 22 including a housing (first case) 22a, a transaxle case (second case) 22b, and a rear case (third case) 22c which are integrally coupled together; and a starting device 23, a mechanical oil pump 30, a forward/reverse switching mechanism 35, a belt type continuously variable transmission mechanism (hereinafter, referred to as "CVT") 40, a gear mechanism 50, a differential gear (differential mechanism) 57, a hydraulic control device 70, etc., which are accommodated in the transmission case 22.

The starting device 23 is formed as a fluid type starting device with a lock-up clutch, and is accommodated in the housing 22a. As shown in FIG. 2, the starting device 23 includes a pump impeller 23p connected to the crankshaft of the engine 12 through a front cover 23f serving as an input member; a turbine runner 23t coupled to an input shaft 41 of the CVT 40 at all times; a stator 23s disposed on the inner side of the pump impeller 23p and the turbine runner 23t to rectify the flow of hydraulic oil (ATF) from the turbine runner 23t to the pump impeller 23p; a one-way clutch 23o that limits the rotation direction of the stator 23s to one direction; a damper mechanism 24; a lock-up clutch 25; and the like. The pump impeller 23p, the turbine runner 23t, and the stator 23s function as a torque converter by the action of the stator 23s when a difference in rotational speed between the pump impeller 23p and the turbine runner 23t is large, and function as a fluid coupling when the difference in rotational speed therebetween decreases. Note, however, that in the starting device 23, the stator 23s and the one-way clutch 23o may be omitted and the pump impeller 23p and the turbine runner 23t may only function as a fluid coupling.

The damper mechanism 24 includes, for example, an input element coupled to the lock-up clutch 25; an intermediate element coupled to the input element through a plurality of first elastic materials; and an output element coupled to the intermediate element through a plurality of second elastic materials and fixed to a turbine hub. The lock-up clutch 25 selectively performs lock-up that mechanically couples (through the damper mechanism 24) the pump impeller 23p to the turbine runner 23t, i.e., the front cover 23f to the input shaft 41 of the CVT 40, and release of the lock-up. Note that the lock-up clutch 25 may be a hydraulic single-plate friction clutch such as that shown in the drawing, or may be a hydraulic multi-plate friction clutch.

The oil pump 30 is a so-called gear pump including a pump assembly including a pump body 31 and a pump cover 32 which are disposed between the starting device 23 and the forward/reverse switching mechanism 35, an inner rotor (externally toothed gear) 33, an outer rotor (internally toothed gear) 34, etc. The pump body 31 and the pump cover 32 are fixed to the housing 22a and the transaxle case 22b. In addition, the inner rotor 33 is coupled to the pump impeller 23p through a hub. By this, when the inner rotor 33 rotates by power from the engine 12, by the oil pump 30, hydraulic oil (ATF) in an oil pan (hydraulic oil storage part) 60 is sucked through a strainer 65 and the hydraulic oil whose pressure has been boosted is supplied (discharged) to the hydraulic control device 70 (see FIG. 3).

The forward/reverse switching mechanism 35 is accommodated in the transaxle case 22b, and includes a double-pinion planetary gear 36; and a clutch C1 and a brake B1 which serve as hydraulic friction engagement elements. The planetary gear 36 includes a sun gear fixed to the input shaft 41 of the CVT 40; a ring gear; and a carrier that supports a pinion gear which meshes with the sun gear and a pinion gear which meshes with the ring gear and that is coupled to a primary shaft 42 of the CVT 40. The clutch C1 rotatably disconnects the carrier of the planetary gear 36 from the input shaft 41 (sun gear), and connects the carrier to the input shaft 41 when hydraulic pressure from the hydraulic control device 70 is supplied to an engagement oil chamber. In addition, the brake B1 rotatably releases the ring gear of the planetary gear 36 from the transaxle case 22b, and unrotatably fixes the ring gear to the transaxle case 22b when hydraulic pressure from the hydraulic control device 70 is supplied to an engagement oil chamber.

By this, by disengaging the brake B1 and engaging the clutch C1, power transmitted to the input shaft 41 is transmitted to the primary shaft 42 of the CVT 40 as it is, by which the vehicle can travel forward. In addition, by engaging the brake B1 and disengaging the clutch C1, the rotation of the input shaft 41 is converted to reverse rotation, and the reverse rotation is transmitted to the primary shaft 42 of the CVT 40, by which the vehicle can travel backward. Furthermore, by disengaging the clutch C1 and the brake B1, the connection between the input shaft 41 and the primary shaft 42 can be disconnected.

The CVT 40 includes a primary pulley 43 provided on the primary shaft (first shaft) 42 serving as a drive-side rotating shaft; a secondary pulley 45 provided on a secondary shaft (second shaft) 44 disposed in parallel to the primary shaft 42 and serving as a driven-side rotating shaft; a transmission belt 46 that runs on a pulley groove of the primary pulley 43 and a pulley groove of the secondary pulley 45; a primary cylinder (first hydraulic cylinder) 47 which is a hydraulic actuator for setting the groove width of the primary pulley 43; and a secondary cylinder (second hydraulic cylinder) 48 which is a hydraulic actuator for setting the groove width of the secondary pulley 45. The primary pulley 43 includes a fixed sheave 43a formed integrally with the primary shaft 42; and a movable sheave 43b supported on the primary shaft 42 through a ball spline so as to be swingable in an axial direction. In addition, the secondary pulley 45 includes a fixed sheave 45a formed integrally with the secondary shaft 44; and a movable sheave 45b that is supported on the secondary shaft 44 through a ball spline so as to be swingable in an axial direction and that is biased in the axial direction by a return spring 49 which is a compression spring.

The primary cylinder 47 is formed behind the movable sheave 43b of the primary pulley 43, and the secondary cylinder 48 is formed behind the movable sheave 45b of the secondary pulley 45. Hydraulic pressure is supplied to the primary cylinder 47 and the secondary cylinder 48 from the hydraulic control device 70 to set the groove widths of the primary pulley 43 and the secondary pulley 45. By this, by controlling hydraulic pressure supplied to the primary cylinder 47 and the secondary cylinder 48, it becomes possible to steplessly change the speed of power transmitted to the primary shaft 42 from the engine 12 through the starting device 23 and the forward/reverse switching mechanism 35, and transmit the power to the secondary shaft 44. Then, the power transmitted to the secondary shaft 44 is transmitted to the left and right drive wheels through the gear mechanism 50, the differential gear 57, and the drive shafts.

The gear mechanism 50 includes a counter drive gear 51 that rotates together with the secondary shaft 44; a countershaft (third shaft) 52 that extends in parallel to the secondary shaft 44 and the drive shafts 59 and is rotatably supported by the transmission case 22 through a bearing; a counter driven gear 53 fixed to the countershaft 52 and meshing with the counter drive gear 51; a drive pinion gear (final drive gear) 54 formed integrally with the countershaft 52 or fixed to the countershaft 52; and a differential ring gear (final driven gear) 55 meshing with the drive pinion gear 54 and coupled to the differential gear 57.

Figure 3:
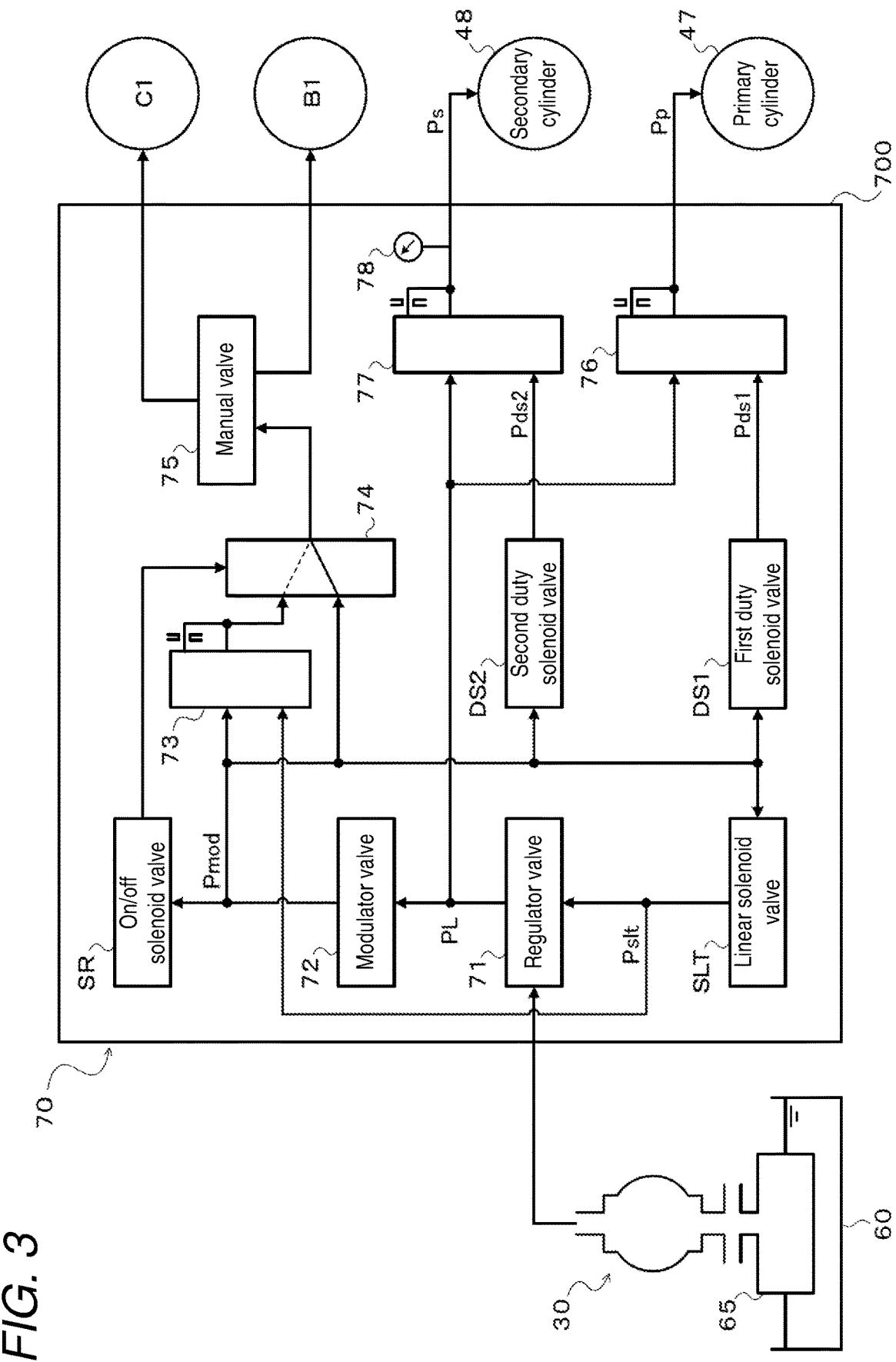
FIG. 3 is a system diagram showing a hydraulic control device included in the power transmission device of the present disclosure.

FIG. 3 is a system diagram showing the main portion of the hydraulic control device 70. As shown in the drawing, the hydraulic control device 70 is connected to the above-described oil pump 30 that is driven by power from the engine 12 to suck and discharge hydraulic oil from the oil pan 60 through the strainer 65. The hydraulic control device 70 includes, as shown in FIG. 3, a valve body 700 having a plurality of oil passages formed therein, a primary regulator valve 71, a modulator valve 72, a pressure regulating valve 73, a switching valve 74, a manual valve 75, a linear solenoid valve SLT, first and second duty solenoid valves DS1 and DS2, an on/off solenoid valve (signal pressure output valve) SR, a primary sheave pressure control valve 76, a secondary sheave pressure control valve 77, etc.

The primary regulator valve 71 is connected to a discharge port of the oil pump 30 through an oil passage, and generates line pressure PL serving as hydraulic source pressure which is supplied to the clutch C1 and the brake B1 of the forward/reverse switching mechanism 35, the primary cylinder 47, the secondary cylinder 48, etc., by regulating the pressure of hydraulic oil from the oil pump 30 using hydraulic pressure from the linear solenoid valve SLT as signal pressure. The modulator valve 72 regulates (reduces) the pressure of hydraulic oil (line pressure PL) from the primary regulator valve 71, and outputs substantially constant modulator pressure Pmod.

The pressure regulating valve 73 regulates the modulator pressure Pmod from the modulator valve 72 using hydraulic pressure from the linear solenoid valve SLT as signal pressure, and outputs the resulting pressure. The pressure regulating valve 73 includes a spool (not shown) disposed in the valve body 700 so as to be movable in an axial direction, a spring that biases the spool, an input port that communicates with an output port of the modulator valve 72, a signal pressure input port that communicates with an output port of the linear solenoid valve SLT, an output port, a drain port, etc. The pressure regulating valve 73 moves the spool against bias force of the spring based on hydraulic pressure from the linear solenoid valve SLT to change the amount of communication between the input port and the output port, and thereby regulates the modulator pressure Pmod and outputs the resulting pressure. In addition, when the supply of hydraulic pressure from the linear solenoid valve SLT to the signal pressure input port of the pressure regulating valve 73 is stopped, the spool is biased by the spring, by which the output port of the pressure regulating valve 73 communicates with the drain port.

The switching valve 74 includes a spool (not shown) disposed in the valve body 700 so as to be movable in an axial direction, a spring that biases the spool, a first input port to which the modulator pressure Pmod is supplied, a second input port that communicates with the output port of the pressure regulating valve 73, a signal pressure input port that communicates with an output port of the on/off solenoid valve SR, an output port, etc. In the present embodiment, the mounting state of the switching valve 74 is a first state in which by the spool biased by the spring, the first input port and the output port communicate with each other, and communication between the second input port and the output port is cut off (see a solid line in FIG. 3). By this, when the switching valve 74 forms the first state, it becomes possible to output the modulator pressure Pmod from the output port of the switching valve 74.

In addition, when signal pressure from the on/off solenoid valve SR is supplied to the signal pressure input port of the switching valve 74, the spool moves against bias force of the spring, and the switching valve 74 forms a second state. When the switching valve 74 forms the second state, by the spool the communication between the first input port and the output port is cut off and the second input port and the output port communicate with each other (see a broken line in FIG. 3). By this, when the switching valve 74 forms the second state, hydraulic pressure supplied from the pressure regulating valve 73 can be outputted from the output port of the switching valve 74. Therefore, when the clutch C1 or the brake B1 is engaged or disengaged, by controlling the on/off solenoid valve SR such that the switching valve 74 forms the second state and controlling the linear solenoid valve SLT independently of the accelerator pedal position Acc, etc., it becomes possible to supply hydraulic pressure regulated by the pressure regulating valve 73 to the clutch C1, etc.

The manual valve 75 is a spool valve that supplies, in conjunction with the shift lever 95, hydraulic pressure from the switching valve 74 to either one of the clutch C1 and the brake B1 based on a shift position SP, or cuts off the supply of hydraulic pressure to the clutch C1 and the brake B1. The manual valve 75 includes an input port that communicates with the output port of the switching valve 74, a first output port that communicates with a hydraulic oil inlet of the clutch C1 of the forward/reverse switching mechanism 35, a second output port that communicates with a hydraulic oil inlet of the brake B1 of the forward/reverse switching mechanism 35, and a drain port. When a P (parking) position or an N (neutral) position is selected as a shift position by the driver, the communication between the input port and the first and second output ports is cut off by a spool of the manual valve 75. In addition, when a D position or an L (low) position is selected as a shift position by the driver, the input port communicates only with the first output port by the spool of the manual valve 75, by which it becomes possible to supply hydraulic pressure from the switching valve 74, i.e., the modulator pressure Pmod or the output pressure from the pressure regulating valve 73, to the clutch C1 (forward clutch) of the forward/reverse switching mechanism 35. Furthermore, when an R (reverse) position is selected as a shift position by the driver, the input port communicates only with the second output port by the spool of the manual valve 75, by which it becomes possible to supply hydraulic pressure from the switching valve 74 to the brake (reverse clutch) B1 of the forward/reverse switching mechanism 35.

The linear solenoid valve SLT is a normally open solenoid valve and, for example, regulates the pressure of hydraulic oil from the modulator valve 72 (oil pump 30 side) and outputs hydraulic pressure Pslt determined based on the accelerator pedal position Acc of the vehicle 10 or the degree of opening of the throttle valve. The first duty solenoid valve DS1, for example, regulates the modulator pressure Pmod from the modulator valve 72 and generates duty solenoid pressure Pds1 serving as signal pressure. The second duty solenoid valve DS2, for example, regulates the modulator pressure Pmod from the modulator valve 72 and generates duty solenoid pressure Pds2 serving as signal pressure. The on/off solenoid valve SR is a normally closed on/off solenoid valve, and an input port of the on/off solenoid valve SR communicates with the output port of the modulator valve 72. The on/off solenoid valve SR opens upon the passage of current to a solenoid part, and outputs the modulator pressure Pmod from the modulator valve 72 as signal pressure from its output port.

The primary sheave pressure control valve 76 regulates the line pressure PL using the duty solenoid pressure Pds1 from the first duty solenoid valve DS1 as signal pressure, and generates primary sheave pressure Pp for the primary pulley 43, i.e., the primary cylinder 47. In addition, the secondary sheave pressure control valve 77 regulates the line pressure PL using the duty solenoid pressure Pds2 from the second duty solenoid valve DS2 as signal pressure, and generates secondary sheave pressure Ps for the secondary pulley 45, i.e., the secondary cylinder 48.

Figure 4:
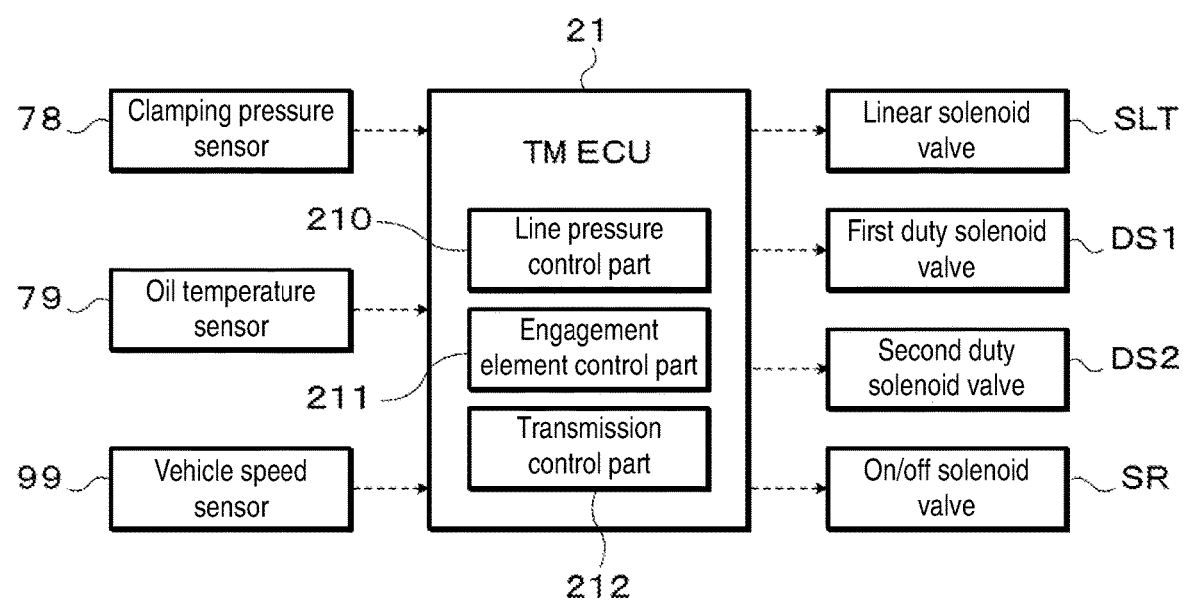
FIG. 4 is a control block diagram of the power transmission device of the present disclosure.

The above-described linear solenoid valve SLT, first and second duty solenoid valves DS1 and DS2, and on/off solenoid valve SR are all controlled by the TMECU 21. Namely, the CPU of the TMECU 21 controls drive circuits (not shown) for the linear solenoid valve SLT, the first and second duty solenoid valves DS1 and DS2, and the on/off solenoid valve SR such that current determined based on a hydraulic pressure instruction value, etc., is applied to a solenoid part of each valve from an auxiliary battery which is not shown. In the TMECU 21, a line pressure control part 210, an engagement element control part 211, and a transmission control part 212 are constructed by cooperation between hardware such as the CPU, the ROM, and the RAM and software such as a control program installed in the ROM. In addition, as shown in FIG. 4, a clamping pressure sensor 78 that detects secondary sheave pressure Ps supplied to the secondary cylinder 48, as clamping pressure of the transmission belt 46, and an oil temperature sensor 79 that detects the temperature of hydraulic oil in the hydraulic control device 70 (hereinafter, referred to as "oil temperature Toil") are connected to the TMECU 21. A detection value of the clamping pressure sensor 78 is hereinafter referred to as "belt clamping pressure Pbc".

The line pressure control part 210 (CPU) sets a hydraulic pressure instruction value Pslt* based on the accelerator pedal position Acc of the vehicle 10 or the degree of opening of the throttle valve, and controls the drive circuit (not shown) for the linear solenoid valve SLT such that current determined based on the hydraulic pressure instruction value Pslt* is applied. By this, it becomes possible for the primary regulator valve 71 to regulate the line pressure PL to a value determined based on the accelerator pedal position Acc of the vehicle 10, etc. In addition, when the engagement element control part 211 engages or disengages the clutch C1 or the brake B of the forward/reverse switching mechanism 35, the engagement element control part 211 turns on and opens the on/off solenoid valve SR, and sets a hydraulic pressure instruction value Pslt* such that the output pressure from the pressure regulating valve 73 reaches a target pressure which is separately set, and controls the drive circuit (not shown) for the linear solenoid valve SLT such that current determined based on the hydraulic pressure instruction value Pslt* is applied.

The transmission control part 212 sets a target pressure Pptag for the primary sheave pressure Pp determined based on a target gear ratio of the CVT 40 which is determined based on the accelerator pedal position Acc, the vehicle speed V, and the number of revolutions Ne of the engine 12, and sets a hydraulic pressure instruction value Pds1* based on the target pressure Pptag, and controls the drive circuit (not shown) for the first duty solenoid valve DS1 such that current determined based on the hydraulic pressure instruction value Pds1* is applied. Furthermore, the transmission control part 212 sets, based on torque (engine torque) transmitted to the input shaft 41, a target belt clamping pressure Pstag which is a target pressure for the secondary sheave pressure Ps such that a slip of the transmission belt 46 of the CVT 40 is suppressed by the secondary sheave pressure Ps, and sets a hydraulic pressure instruction value Pds2* based on the target belt clamping pressure Pstag, and controls the drive circuit (not shown) for the second duty solenoid valve DS2 such that current determined based on the hydraulic pressure instruction value Pds2* is applied.

Figure 5:
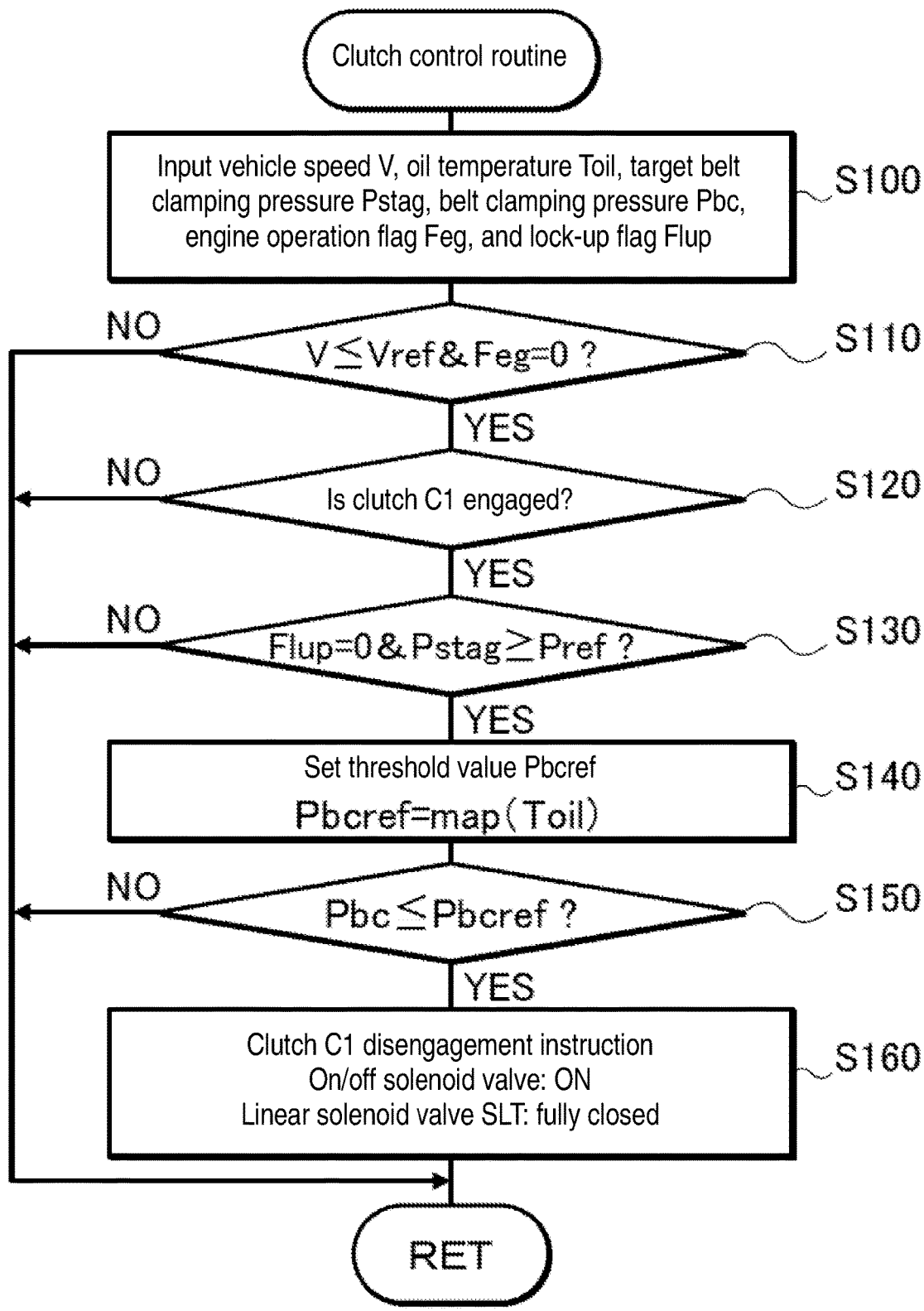
FIG. 5 is a flowchart showing an example of a clutch control routine performed in the power transmission device of the present disclosure.

Next, with reference to FIG. 5, a control procedure of the clutch C1 of the forward/reverse switching mechanism 35 in the power transmission device 20 which is performed when the above-described deceleration idle reduction control is performed in the vehicle 10 will be described. FIG. 5 is a flowchart showing an example of a clutch control routine which is repeatedly performed by the engagement element control part 211 (CPU) of the TMECU 21 every predetermined time interval (e.g., a few msec) when the vehicle 10 is traveling forward.

Upon starting the clutch control routine of FIG. 5, the engagement element control part 211 of the TMECU 21 performs a process of inputting data required for control, such as vehicle speed V from the vehicle speed sensor 99, belt clamping pressure Pbc from the clamping pressure sensor 78, oil temperature Toil from the oil temperature sensor 79, and a target belt clamping pressure Pstag, the value of an engine operation flag Feg, and the value of a lock-up flag Flup which are separately set (step S100). The engine operation flag Feg is set to the value "1" when the engine 12 is operated, and is set to the value "0" when the operation of the engine 12 is stopped. In addition, the lock-up flag Flup is set to the value "1" when lock-up is performed by the lock-up clutch 25, and is set to the value "0" when lock-up is released.

After the data input process at step S100, the engagement element control part 211 determines whether the inputted vehicle speed V is less than or equal to the above-described engine stop vehicle speed Vref and the engine operation flag Feg is the value "0" (step S110). If it is determined at step S110 that the vehicle speed V exceeds the engine stop vehicle speed Vref or the engine operation flag Feg is the value "1" (step S110: NO), the engagement element control part 211 temporarily ends the routine without performing processes after step S110. On the other hand, if it is determined at step S110 that the vehicle speed V is less than or equal to the engine stop vehicle speed Vref and the engine operation flag Feg is the value "0" (step S110: YES), the operation of the engine 12 has been stopped by performing the above-described deceleration idle reduction control. In this case, the engagement element control part 211 determines whether the clutch C1 of the forward/reverse switching mechanism 35 is engaged (step S120).

If it is determined at step S120 that the clutch C1 of the forward/reverse switching mechanism 35 is disengaged (step S120: NO), the engagement element control part 211 temporarily ends the routine without performing processes after step S120. On the other hand, if it is determined at step S120 that the clutch C1 of the forward/reverse switching mechanism 35 is engaged (step S120: YES), the engagement element control part 211 determines whether the lock-up flag Flup inputted at step S100 is the value "0" and the target belt clamping pressure Pstag is greater than or equal to a predetermined value Pref (step S130). If it is determined at step S130 that the lock-up flag Flup is the value "1" or the target belt clamping pressure Pstag is less than the value Pref (step S130: NO), the engagement element control part 211 temporarily ends the routine without performing processes at and after step S140.

On the other hand, if it is determined at step S130 that the lock-up flag is the value "0" and the target belt clamping pressure Pstag is greater than or equal to the value Pref (step S130: YES), the lock-up by the lock-up clutch 25 has been released in response to a reduction in vehicle speed V, and application of somewhat high secondary pulley pressure Ps to the secondary pulley 45 from the secondary cylinder 48 has been requested to suppress a slip of the transmission belt 46 of the CVT 40. In this case, the engagement element control part 211 sets a threshold value Pbcref to be compared with the belt clamping pressure Pbc, based on the oil temperature Toil inputted at step S100 (step S140). The threshold value Pbcref is the clamping pressure of the transmission belt 46 required to secure torque capacity of the transmission belt 46 when the deceleration of the vehicle 10 has a predetermined value (relatively high deceleration). In the present embodiment, a map that defines a relationship between the oil temperature Toil and the threshold value Pbcref is stored in the ROM (not shown) of the TMECU 21. The map is created in advance by conducting experiments and analysis, such that the threshold value Pbcref decreases as the oil temperature Toil increases, and the threshold value Pbcref increases as the oil temperature Toil decreases.

After setting the threshold value Pbcref at step S140, the engagement element control part 211 determines whether the belt clamping pressure Pbc inputted at step S100 is less than or equal to the threshold value Pbcref (step S150). If it is determined at step S150 that the clamping pressure Pbc exceeds the threshold value Pbcref (step S150: NO), the engagement element control part 211 temporarily ends the routine without performing a process after step S150. On the other hand, if it is determined at step S150 that the clamping pressure Pbc is less than or equal to the threshold value Pbcref (step S150: YES), in order to disengage the clutch C1 of the forward/reverse switching mechanism 35, the engagement element control part 211 turns on and opens the on/off solenoid valve SR and controls the drive circuit for the linear solenoid valve SLT to fully close the linear solenoid valve SLT (step S160), and temporarily ends the routine.

By performing the process at step S160, the switching valve 74 forms, by signal pressure from the on/off solenoid valve SR, a second state in which the second input port that communicates with the output port of the pressure regulating valve 73 communicates with the output port. In addition, the linear solenoid valve SLT is fully closed, resulting in not supplying hydraulic pressure Pslt from the linear solenoid valve SLT to the signal pressure input port of the pressure regulating valve 73, by which the output port of the pressure regulating valve 73 communicates with the drain port. By this, hydraulic oil in the engagement oil chamber of the clutch C1 is promptly released from the drain port of the pressure regulating valve 73 through the manual valve 75 and the switching valve 74.

As a result of performing the above-described clutch control routine, in the power transmission device 20, when the clamping pressure Pbc of the transmission belt 46 detected by the clamping pressure sensor 78 has reached less than or equal to the threshold value Pbcref after the operation of the engine 12 is stopped in response to deceleration of the vehicle 10 by deceleration idle reduction control, the on/off solenoid valve SR and the linear solenoid valve SLT of the hydraulic control device 70 are controlled to disengage the clutch C1 of the forward/reverse switching mechanism 35. Namely, when deceleration torque transmitted to the secondary shaft from the drive wheels DW has relatively increased after the operation of the engine 12 is stopped in response to deceleration of the vehicle 10 and before the vehicle 10 is stopped, the clutch C1 of the forward/reverse switching mechanism 35 is disengaged at a point in time when the deceleration torque has relatively increased.

As such, by detecting clamping pressure of the transmission belt 46 by the clamping pressure sensor 78 and comparing the belt clamping pressure Pbc detected by the clamping pressure sensor 78 with the threshold value Pbref, it becomes possible to accurately determine whether sufficient clamping pressure Pbc (secondary pulley pressure Ps) of the transmission belt 46 can be secured by hydraulic oil discharged from the oil pump 30. Furthermore, upon making a disengagement determination of the clutch C1, there is no need to use the number of revolutions Ne of the engine 12 from the EGECU 14 whose calculation accuracy deteriorates in a low revolution range, and the influence of variations in hardware in the hydraulic control device 70 can be substantially eliminated. By this, the clutch C1 is disengaged at appropriate timing after the operation of the engine 12 is stopped in response to deceleration of the vehicle 10, to disconnect the CVT 40 from the engine 12, enabling to excellently suppress a slip of the transmission belt 46 of the CVT 40 which is caused by insufficient belt clamping pressure Pbc (secondary pulley pressure Ps) relative to deceleration torque transmitted to the secondary shaft from the drive wheels DW. Furthermore, responsiveness to acceleration when a restart of the engine 12 is requested after the operation of the engine 12 is stopped in response to deceleration of the vehicle 10 can be excellently secured.

In addition, in the power transmission device 20, the threshold value Pbcref used at step S150 is set based on the oil temperature Toil, as clamping pressure required to secure torque capacity of the transmission belt 46 when the deceleration of the vehicle 10 has the predetermined value (step S140 of FIG. 5.) By this, by appropriately setting the threshold value Pbcref which is compared with belt clamping pressure Pbc detected by the clamping pressure sensor 78, it becomes possible to disengage the clutch C1 at more appropriate timing after the operation of the engine 12 is stopped in response to deceleration of the vehicle 10.

Furthermore, the hydraulic control device 70 of the power transmission device 20 includes the primary regulator valve 71 that regulates the pressure of hydraulic oil from the oil pump 30 and generates line pressure PL; the pressure regulating valve 73 that regulates modulator pressure Pmod from the modulator valve 72 (primary regulator valve 71 side) using, as signal pressure, hydraulic pressure Pslt from the linear solenoid valve SLT, and generates hydraulic pressure for the clutch C1, etc.; the on/off solenoid valve SR that outputs signal pressure; and the switching valve 74 that forms, based on the output state of the signal pressure of the on/off solenoid valve SR, a first state in which supply of hydraulic pressure (modulator pressure Pmod) from the primary regulator valve 71 side to the clutch C1, etc., is allowed, and a second state in which supply of hydraulic pressure from the pressure regulating valve 73 to the clutch C1, etc., is allowed. Then, when the engagement element control part 211 of the TMECU 21 disengages the clutch C1 based on the belt clamping pressure Pbc, the engagement element control part 211 controls the on/off solenoid valve SR such that the switching valve 74 forms the second state, and controls the pressure regulating valve 73, i.e., the linear solenoid valve SLT, such that hydraulic pressure is not supplied to the clutch C1 and hydraulic oil is released from the engagement oil chamber of the clutch C1. By this, comparing with a case in which the clutch C1 is gradually disengaged (torque capacity decreases) due to a reduction in line pressure PL (modulator pressure Pmod) associated with a reduction in the number of revolutions of the input shaft 41 or the pump impeller 23$p$, it becomes possible to promptly release hydraulic oil from the engagement oil chamber of the clutch C1 through the pressure regulating valve 73.

Note that in the power transmission device 20, the forward/reverse switching mechanism 35, i.e., the clutch C1 (and the brake B1) serving as a hydraulic engagement element, is disposed between the engine 12 (starting device 23) and the CVT 40 (primary pulley 43), but the forward/reverse switching mechanism 35, i.e., the clutch C1, etc., may be disposed between the secondary pulley 45 of the CVT 40 and the drive shafts 59 (drive wheels DW). In addition, in the hydraulic control device 70 in the power transmission device 20, hydraulic pressure for the clutch C1 and the brake B1 is regulated by the linear solenoid valve SLT and the pressure regulating valve 73, but instead of the pressure regulating valve 73, a dedicated linear solenoid valve or the like that regulates hydraulic pressure for the clutch C1, etc., may be provided. Furthermore, in the hydraulic control device 70, the first duty solenoid valve DS1 and the primary sheave pressure control valve 76 may be replaced with a linear solenoid valve, and the second duty solenoid valve DS2 and the secondary sheave pressure control valve 77 may be replaced with a linear solenoid valve. In addition, in the above-described vehicle 10, deceleration idle reduction control may be performed when the vehicle speed V has been reduced to the engine stop vehicle speed Vref without the driver stepping on the brake pedal 93.

As described above, a control device for a power transmission device of the present disclosure is a power transmission device (20) mounted on a vehicle (10) in which operation of an engine (12) is stopped when vehicle speed (V) has been reduced to a predetermined vehicle speed (Vref), the power transmission device (20) including an oil pump (30) driven by the engine (12) to discharge oil; a hydraulic control device (70) that regulates pressure of oil from the oil pump (30); a continuously variable transmission mechanism (40) including a primary pulley (43), a secondary pulley (45), a belt (46) wound around the primary pulley (43) and the secondary pulley (45), a first hydraulic cylinder (47) that sets a groove width of the primary pulley (43) by hydraulic pressure (Pp) from the hydraulic control device (70), and a second hydraulic cylinder (48) that sets a groove width of the secondary pulley (45) by hydraulic pressure (Ps) from the hydraulic control device (70); a hydraulic engagement element (C1) that is engaged by hydraulic pressure from the hydraulic control device (70) to couple the continuously variable transmission mechanism (40) to the engine (12) or drive wheels (DW) of the vehicle (10); and a clamping pressure sensor (78) that detects clamping pressure (Pbc) of the belt (47) applied by the first or second hydraulic cylinder (47, 48), and the power transmission device (20) includes an engagement element control part (211) that controls the hydraulic control device (78) to disengage the hydraulic engagement element (C1) when clamping pressure (Pbc) of the belt (46) detected by the clamping pressure sensor (78) has reached less than or equal to a threshold value (Pbcref) after operation of the engine (12) is stopped in response to deceleration of the vehicle (10).

The engagement element control part of the power transmission device of the present disclosure controls the hydraulic control device to disengage the hydraulic engagement element when clamping pressure of the belt detected by the clamping pressure sensor has reached less than or equal to the threshold value after operation of the engine is stopped in response to deceleration of the vehicle. As such, by detecting clamping pressure of the belt by the clamping pressure sensor and comparing the detection value of the clamping pressure sensor with the threshold value, it becomes possible to accurately determine whether sufficient clamping pressure of the belt can be secured by oil discharged from the oil pump. Furthermore, upon making a disengagement determination of the hydraulic engagement element, there is no need to use the number of revolutions of the engine whose accuracy deteriorates in a low revolution range, and the influence of variations in hardware in the hydraulic control device can be substantially eliminated. By this, the hydraulic engagement element is disengaged at appropriate timing after the operation of the engine is stopped in response to deceleration of the vehicle, to disconnect the continuously variable transmission mechanism from the engine or the drive wheels, enabling to excellently suppress a slip of the belt of the continuously variable transmission mechanism. Furthermore, responsiveness to acceleration when a restart of the engine is requested after the operation of the engine is stopped in response to deceleration of the vehicle can be excellently secured.

In addition, the threshold value (Pbcref) may be set as clamping pressure required to secure torque capacity of the belt (46) when deceleration of the vehicle (10) has a predetermined value, or the threshold value (Pbcref) may be set so as to increase as temperature of the oil (Toil) decreases. By appropriately setting the threshold value which is compared with clamping pressure detected by the clamping pressure sensor, it becomes possible to disengage the clutch at more appropriate timing after the operation of the engine is stopped in response to deceleration of the vehicle.

Furthermore, the power transmission device may further include a lock-up clutch (25) provided between the engine (12) and the primary pulley (43), and the engagement element control part (211) may control the hydraulic control device (70) to disengage the hydraulic engagement element (C1) when the lock-up clutch (25) is disengaged and clamping pressure (Pbc) of the belt (46) has reached less than or equal to a threshold value (Pbcref).

In addition, the hydraulic control device (70) may include a regulator valve (71) that regulates pressure of oil from the oil pump (30) and generates source pressure (PL); a pressure regulating valve (73) that regulates hydraulic pressure (Pmod) from the regulator valve (71) side and generates hydraulic pressure for the hydraulic engagement element (C1); a signal pressure output valve (SR) that outputs signal pressure; and a switching valve (74) that forms, based on an output state of the signal pressure of the signal pressure output valve (SR), a first state in which supply of hydraulic pressure (Pmod) from the regulator valve (71) side to the hydraulic engagement element (C1) is allowed, and a second state in which supply of hydraulic pressure from the pressure regulating valve (73) to the hydraulic engagement element (71) is allowed, and when the engagement element control part (211) disengages the hydraulic engagement element (C1) based on clamping pressure (Pbc) of the belt (46), the engagement element control part (211) may control the signal pressure output valve (SR) such that the switching valve (74) forms the second state, and control the pressure regulating valve (73) such that hydraulic pressure is not supplied to the hydraulic engagement element (C1). By this, when the hydraulic engagement element is engaged or disengaged, by controlling the signal pressure output valve such that the switching valve forms the second state, it becomes possible to supply hydraulic pressure regulated by the pressure regulating valve to the hydraulic engagement element, or promptly release oil from the hydraulic engagement element.

Furthermore, operation of the engine (12) of the vehicle (10) may be stopped when the vehicle speed (V) has been reduced to the predetermined vehicle speed (Vref) by a driver stepping on a brake pedal (93).

A method for controlling a power transmission device of the present disclosure is a method for controlling a power transmission device (20) mounted on a vehicle (10) in which operation of an engine (12) is stopped when vehicle speed (V) has been reduced to a predetermined vehicle speed (Vref), the power transmission device (20) including an oil pump (30) driven by the engine (12) to discharge oil; a hydraulic control device (70) that regulates pressure of oil from the oil pump (30); a continuously variable transmission mechanism (40) including a primary pulley (43), a secondary pulley (45), a belt (46) wound around the primary pulley (43) and the secondary pulley (45), a first hydraulic cylinder (47) that sets a groove width of the primary pulley (43) by hydraulic pressure (Pp) from the hydraulic control device (70), and a second hydraulic cylinder (48) that sets a groove width of the secondary pulley (45) by hydraulic pressure (Ps) from the hydraulic control device (70); a hydraulic engagement element (C1) that is engaged by hydraulic pressure from the hydraulic control device (70) to couple the continuously variable transmission mechanism (40) to the engine (12) or drive wheels (DW) of the vehicle (10); and a clamping pressure sensor (78) that detects clamping pressure (Pbc) of the belt (47) applied by the first or second hydraulic cylinder (47, 48), and when clamping pressure (Pbc) of the belt (46) detected by the clamping pressure sensor (78) has reached less than or equal to a threshold value (Pbcref) after operation of the engine (12) is stopped in response to deceleration of the vehicle (10), the hydraulic engagement element (C1) is disengaged.

According to the method of the present disclosure, the hydraulic engagement element is disengaged at appropriate timing after the operation of the engine is stopped in response to deceleration of the vehicle, to disconnect the continuously variable transmission mechanism from the engine or the drive wheels, enabling to excellently suppress a slip of the belt of the continuously variable transmission mechanism. Furthermore, responsiveness to acceleration when a restart of the engine is requested after the operation of the engine is stopped in response to deceleration of the vehicle can be excellently secured.

The invention of the present disclosure is not limited to the above-described embodiment, and needless to say, various changes which come within the meaning and range of equivalency of the present disclosure can be made. Furthermore, the above-described embodiment is merely one specific mode of the invention described in the "SUMMARY OF DISCLOSURE" section and does not limit the elements of the invention described in the "SUMMARY OF DISCLOSURE" section.

INDUSTRIAL APPLICABILITY

The various aspects of the present disclosure can be used in, for example, a manufacturing industry of a power transmission device including a belt type continuously variable transmission mechanism.

The invention claimed is:

1. A power transmission device mounted on a vehicle in which operation of an engine is stopped when vehicle speed has been reduced to a predetermined vehicle speed, the power transmission device including an oil pump driven by the engine to discharge oil; a hydraulic control device that regulates pressure of oil from the oil pump; a continuously variable transmission mechanism including a primary pulley, a secondary pulley, a belt wound around the primary pulley and the secondary pulley, a first hydraulic cylinder that sets a groove width of the primary pulley by hydraulic pressure from the hydraulic control device, and a second hydraulic cylinder that sets a groove width of the secondary pulley by hydraulic pressure from the hydraulic control device; a hydraulic engagement element that is engaged by hydraulic pressure from the hydraulic control device to couple the continuously variable transmission mechanism to the engine or drive wheels of the vehicle; and a clamping pressure sensor that detects clamping pressure of the belt applied by the first or second hydraulic cylinder, and the power transmission device comprising:
an engagement element control part that controls the hydraulic control device to disengage the hydraulic engagement element when clamping pressure of the belt detected by the clamping pressure sensor has reached less than or equal to a threshold value after operation of the engine is stopped in response to deceleration of the vehicle.

2. A control device for the power transmission device according to claim 1, wherein the threshold value is set as clamping pressure required to secure torque capacity of the belt when deceleration of the vehicle has a predetermined value.

3. A control device for the power transmission device according to claim 2, wherein the threshold value is set so as to increase as temperature of the oil decreases.

4. A control device for the power transmission device according to claim 1, wherein
the power transmission device further comprises a lock-up clutch provided between the engine and the primary pulley, and
the engagement element control part controls the hydraulic control device to disengage the hydraulic engagement element when the lock-up clutch is disengaged and clamping pressure of the belt has reached less than or equal to the threshold value.

5. A control device for the power transmission device according to claim 1, wherein
the hydraulic control device includes:
a regulator valve that regulates pressure of oil from the oil pump and generates source pressure;
a pressure regulating valve that regulates hydraulic pressure from the regulator valve side and generates hydraulic pressure for the hydraulic engagement element;
a signal pressure output valve that outputs signal pressure; and
a switching valve that forms, based on an output state of the signal pressure of the signal pressure output valve, a first state in which supply of hydraulic pressure from the regulator valve side to the hydraulic engagement element is allowed, and a second state in which supply of hydraulic pressure from the pressure regulating valve to the hydraulic engagement element is allowed, and
when the engagement element control part disengages the hydraulic engagement element based on clamping pressure of the belt, the engagement element control part controls the signal pressure output valve such that the switching valve forms the second state, and controls the pressure regulating valve such that hydraulic pressure is not supplied to the hydraulic engagement element.

6. A control device for the power transmission device according to claim 1, wherein operation of the engine of the vehicle is stopped when the vehicle speed has been reduced to the predetermined vehicle speed by a driver stepping on a brake pedal.

7. A method for controlling a power transmission device mounted on a vehicle in which operation of an engine is stopped when vehicle speed has been reduced to a predetermined vehicle speed, the power transmission device including;
an oil pump driven by the engine to discharge oil;
a hydraulic control device that regulates pressure of oil from the oil pump;
a continuously variable transmission mechanism including a primary pulley, a secondary pulley, a belt wound around the primary pulley and the secondary pulley, a first hydraulic cylinder that sets a groove width of the primary pulley by hydraulic pressure from the hydraulic control device, and a second hydraulic cylinder that sets a groove width of the secondary pulley by hydraulic pressure from the hydraulic control device;
a hydraulic engagement element that is engaged by hydraulic pressure from the hydraulic control device to couple the continuously variable transmission mechanism to the engine or drive wheels of the vehicle; and
a hydraulic pressure sensor that detects clamping pressure of the belt applied by the first or second hydraulic cylinder,
the method including:
disengaging the hydraulic engagement element when clamping pressure of the belt detected by the hydraulic pressure sensor has reached less than or equal to a threshold value after operation of the engine is stopped in response to deceleration of the vehicle.

* * * * *